UNITED STATES PATENT OFFICE.

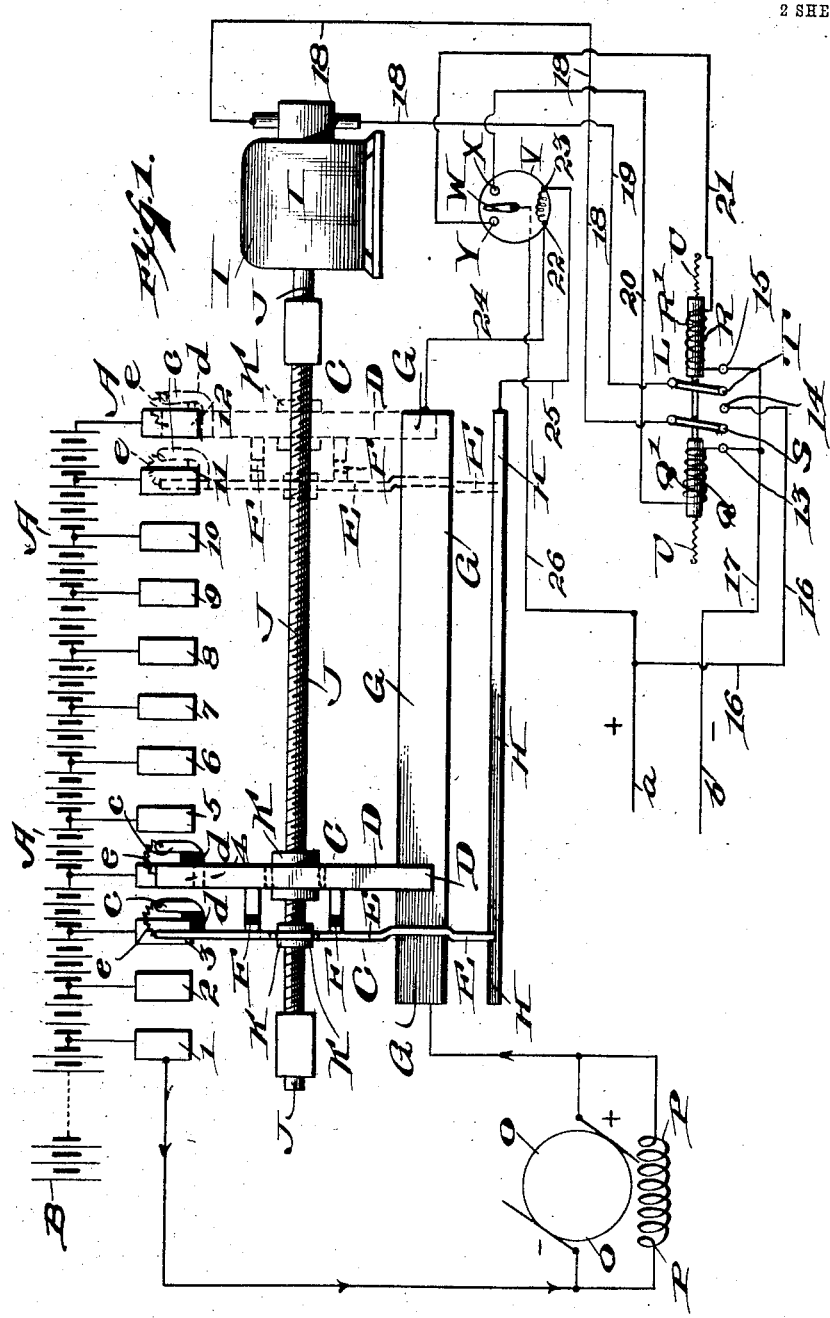

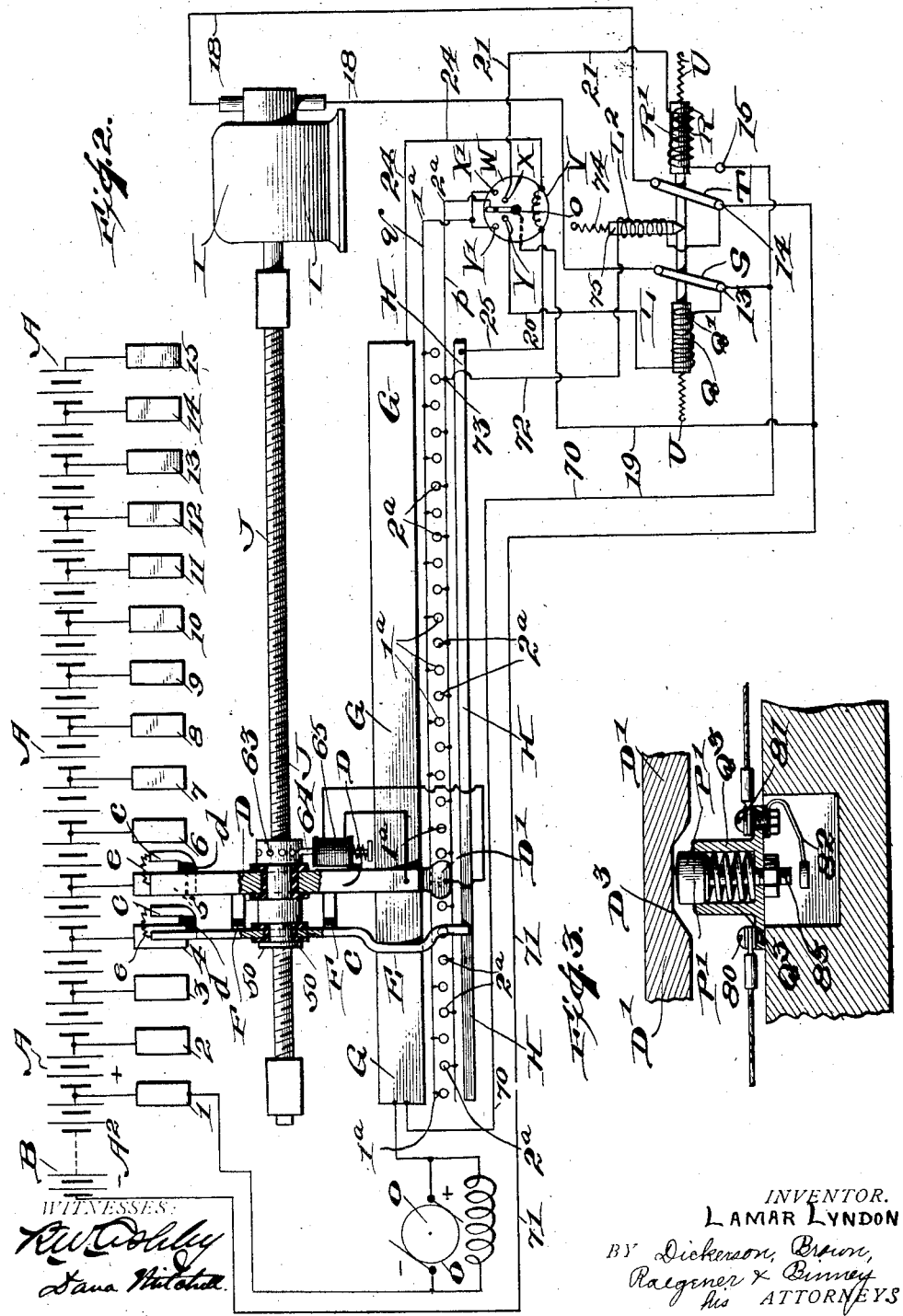

LAMAR LYNDON, OF NEW YORK, N. Y., ASSIGNOR TO GENERAL STORAGE BATTERY COMPANY, OF NEW YORK, N. Y., A CORPORATION OF NEW YORK.

END-CELL SWITCH.

No. 810,958.

Specification of Letters Patent.

Patented Jan. 30, 1906.

Application filed October 17, 1904. Serial No. 228,671.

*To all whom it may concern:*

Be it known that I, LAMAR LYNDON, a citizen of the United States, and a resident of the borough of Manhattan, city, county, and State of New York, have invented certain new and useful Improvements in End-Cell Switches, of which the following is a specification.

This invention relates to end-cell switches for storage batteries; and the object of the invention is to enable the end cells to be automatically charged as necessary for the needs of the system in which the storage battery is used.

Further objects of the invention will hereinafter appear; and to these ends the invention consists of an end-cell switch for carrying out the above objects embodying the features of construction substantially as hereinafter fully described and claimed in this specification and shown in the accompanying diagrams of circuits and apparatus numbered Figures 1 and 2, and in Fig. 3, which is a detail view of a contact.

In systems using storage batteries in which variations in voltage across the external circuit or variations of battery charge and discharge are produced by changing the number of cells in series, as by the use of an end-cell switch, those cells which are connected to the end-cell switch-contacts are not discharged uniformly with the cells in the main body of the battery.

In charging the end cells it is customary to carry the end-cell switch arm or brush to the extreme outer cell-contact, thus placing all of the cells of the battery in series, and when charging has proceeded until the extreme end cell gives indications of being fully charged the switch-arm is moved inward to the next adjacent cell-contact, thus cutting out the end cell or cells connected between the extreme contact and the one adjacent thereto. The charging-current will now flow through the entire battery except the end cell or cells which have thus been cut out. When the next end cell or set of cells gives indications of being fully charged, the switch is again moved to the next adjacent cell-contact, and this mode of operation is continued until the last inner cell-contact is reached. If by this time the cells in the main body of the battery are not fully charged, charging is continued until they also indicate that they are fully charged, and then charging is discontinued.

Heretofore the end-cell switches designed for charging the cells as described have been hand-operated, and it has been difficult to properly maintain the end cells with sufficient charge. According to my invention the end-cell-charging switch is automatic in its operations and is, furthermore, responsive to changes in the condition of charge of individual cells or groups of cells in a battery, and it will automatically set the contact-brush of the switch upon such a cell-contact that all the cells on one side of said contact are fully charged and all on the other side have not been brought to full charge. As long as the cell or group of cells connected to the contact on which the switch-brush rests is fully charged the switch will automatically move to some other contact, cutting out those cells which are charged and continuing charging on those cells which have not yet been fully charged.

In the drawings only so much of the electric circuits is shown as applies to the end cells A and the automatic end-cell-charging switch controlling the cell-contacts 1 to 12, inclusive. The cells in the main body of the battery are indicated at B, and in a system of distribution employing a storage battery the battery may be connected across the line and used in connection with any desired auxiliary apparatus, as a booster, in addition to the main generator or source of supply. The switch forming the subject-matter of this invention is designed to be used for charging purposes in addition to the usual end-cell switch used for including more or less of the end cells in circuit with the line, as the voltage and current requirements may necessitate.

The switch-arm C, as shown, is duplex, being provided with the contact-arms D and E, insulated from each other by the insulation F and connected to move together by suitable means along the series of contacts 1 to 12, inclusive. As shown, the contact-arm D makes contact with the cell-contacts 1 to 12, inclusive, and also with a bus-bar G, while the other contact-arm E makes contact with the cell-contacts and with a bus-bar H. As shown, the contact-arm E does not bear upon the bus-bar G, but is curved or bent in such manner that it passes over the said bus-bar without touching it.

Suitable means are provided for moving the switch-arm C in either direction along the cell-contacts, as shown in this instance an actuating-motor I being provided, connected to operate a screw-shaft J, upon which the switch-arm C is mounted by means of screw-sleeves K. The contact-arms D and E or brushes are suitably insulated from the sleeves K.

The field of the motor I is preferably constantly excited in one direction, and a reversing-switch L is connected to control the direction of rotation of the motor-armature by suitable circuits and connections.

An auxiliary generator O, as shown, is connected between the innermost contact 1 of the end cells A and the bus-bar G, suitable field-winding P being provided for the generator O. The function of the generator O is to charge the end cells as controlled by the switch-arm C.

The reversing-switch L is provided with the controlling magnets or solenoids Q and R, provided with cores Q' and R', connected to the switch-arms S and T and provided with the retracting-springs U. Suitable contacts 13, 14, and 15 are provided adapted to coöperate with the switch-arms S and T.

Current may be supplied to the motor I from any suitable source, (indicated by the mains $a$ and $b$,) which, as shown, are connected by wires 16 and 17 to the switch-contacts 13, 14, and 15. The switch-arms S and T are in turn connected by wires 18 and 19 to the motor-terminals. It will be seen that according to the pair of contacts 13, 14, and 15, which the switch-arms S and T bear upon, the direction in which the current is supplied to the motor will be controlled.

Suitable means are provided for controlling the energizing of the reversing-switch magnets Q and R, said means being in turn controlled by the voltage between the bus-bars G and H, upon which the contact-arms D and E bear, respectively. The voltage between the bus-bars G and H is the voltage of the cell or series of cells connected between the two contacts D and E. While any suitable means may be provided, in this instance a voltmeter V is so arranged and connected in circuit that it controls the magnets Q and R. The needle W of the voltmeter is insulated from the remaining parts and provided with coöperating insulated contacts X and Y, which are connected, respectively, to the magnets Q and R by the wires 20 and 21. A branch circuit is led from the positive main $a$ to the insulated needle W, and the usual terminals 22 and 23 of the voltmeter are connected by wires 24 and 25 to the bus-bars G and H, respectively, in accordance with which arrangement the voltmeter indicates the voltage between said bus-bars. The corresponding movement of the needle W therefore connects one or the other of the magnets Q R in circuit because said magnets are connected to the positive main $a$ by the wire 26 and to the negative main by wire 17.

Preferably the distance between the brushes D and E is substantially equal to the pitch or distance from center to center of two of the contacts 1 to 12, inclusive, and each arm D and E is provided with an auxiliary contact $c$, carried by the main arm or insulated therefrom by insulation $d$. The auxiliary contacts $c$ are connected to the main arms through resistance $e$. The object of this construction is to prevent the short-circuiting of two of the cells.

The operation of the apparatus is as follows: Let it be assumed that the duplex switch-arm C is on the extreme outer contacts 11 and 12, as indicated in dotted lines in the drawings, contact-arm D bearing upon contact 12 and contact-arm E bearing upon contact 11. In this position of the switch-arm C current will pass from the dynamo O through bus-bar G, arm D, and contact 12 to and through all of the end cells A back to contact 1 and out to the negative brush of the generator O. The excitation of the field P of the auxiliary dynamo O will be that due to the voltage impressed across the terminals of the field by all of the end cells in series, which voltage is sufficient to produce an electromotive force in the auxiliary dynamo large enough to send a charging-current through all of the cells A. When the cells connected between the two contacts 11 and 12 upon which contact-arms E and D rest reach substantially full charge, their voltage will have risen to such a point that the needle W of the voltmeter V will be caused to move in one direction or the other—as, for instance, toward the right—until it comes into contact with contact X. The solenoid or magnet Q is then energized and closes switch L by moving contact-blades S and T upon contacts 13 and 14, thereby closing the circuit of the motor I, which rotates in a direction to move the duplex brush C inward or toward the inner contact 1 of the end cells A. When the contact-arms E and D rest upon the next adjacent pair of contacts 10 and 11 of the series, if the cells A, connected to said pair of contacts, be substantially fully charged the voltage will be high enough to maintain the needle W of the voltmeter against contact X and the motor will continue to rotate until the contact-arms E and D bear upon a pair of contacts of the series 1 to 12, between which the cells A connected thereto are not fully charged and the voltage of which is insufficient to maintain the needle W against contact X. When this point is reached, the motor-circuit will be broken by the reversing-switch L and the brush C will be brought to rest bearing upon a pair of the contacts of the series 1 to 12, inclusive. Lesser voltage is therefore required at the dynamo terminals. Since, however, the excitation of the shunt field P is always proportional to the number of cells included in the charging-circuit, it is obvious that this voltage will automatically adjust itself to the number of cells charged. Furthermore, as the voltage in the charging-circuit rises, due to the well-understood increase in battery voltage with increase of charge, a proportional increase in the excitation of the field P will take place, so that charging-current will be maintained at its proper value. If the brush C comes to rest at contacts near the extreme inner contact 1, all the cells connected with those contacts between the brush C and contact 12 being full and if charge and discharge of the battery should take place under these conditions, so that some or all of the cells between the brush C and contact 12 should be discharged, then this discharge will also take place through the cells lying between the pair of contacts at which the brush C rests and the voltage of the cells between this pair of contacts will fall. The voltmeter-needle W will therefore be deflected in the opposite direction toward the left until it makes contact with contact Y, thereby energizing solenoid or magnet R of the reversing-switch and completing a circuit between the motor I in such direction as to cause the motor to rotate to move the brush C outward, thus including a larger number of cells in the charging-circuit.

It will be seen that in the construction and arrangement of the switching apparatus contact 1 is arranged beyond the possible travel of the brush C, so that the generator O will never be short-circuited, or any other suitable means may be provided for accomplishing this object.

According to this invention it will be seen that automatic charging means are provided, whereby the end cells are automatically charged as required by the system, and this automatic charging means is automatically controlled by the electric conditions or potential of the cells. The position of the charging-switch is automatically changed to charge different cells as required in such manner that any or all of the cells are automatically recharged as they become discharged beyond a predetermined amount. The actuating means for the switch is controlled by the voltage of one or more of the cells, which voltage is impressed upon the bus-bars G and H.

In the diagram of Fig. 2 a modification of the invention is shown, the object of which is to insure that the brush moves from one contact to the next, no more and no less. If during the time that the brush C is moving the needle W of the voltmeter should for any reason fall away from the contact X or Y, with which it coöperates, it will be seen that the motor I would stop. One of the objects of the modification shown in Fig. 2 is to guard against this contingency. As in Fig. 1, the reversing-switch L controls the motor I, which in turn actuates the switch C. In accordance with the invention, as modified in Fig. 2, a portion of the apparatus disclosed in the application of Joseph Bijur, filed October 14, 1904, Serial No. 228,405, for end-cell switches, is used, I having been given permission to show and describe in this application the arrangement of magnetic detent for locking the traveling sleeve to the screw-threaded shaft J. As shown, upon the screw-shaft J is a traveling internally-screw threaded sleeve 50, which is moved in one direction or the other along shaft J, according to the direction of rotation of the motor I. The sleeve 50 carries the duplex brush C, the arms D and E of which are suitably insulated therefrom. The traveling sleeve 50, as shown, is loose within the switch-arms D and E, and means are provided for automatically connecting said sleeve fast to the arms, so that rotation of the shaft J will cause the sleeve to travel. As shown, the sleeve is provided with holes 63, with which a pin 64 is adapted to coöperate. This pin 64 is controlled by a magnet 65, of which the pin forms the armature. Normally the pin 64 is held out of engagement with one of the holes 63 by the retracting-spring 66. When magnet 65 is energized, the pin is moved into one of the holes 63, and since the magnet is carried by the arm D and the two arms are secured together the sleeve and both arms will be locked together. The voltmeter V is provided with additional contacts X′ and Y′, with which the insulated end o of the needle W coöperates. On the end-cell switch are arranged two sets of auxiliary contact-buttons $1^a$ and $2^a$, the pitch or distance apart of the buttons of each set being equal to the pitch or distance from center to center of the main contacts 1 to 12, inclusive, on the switch. The two sets $1^a$ and $2^a$ are spaced alternately, so that the distance from a contact $1^a$ of one set to the next adjacent contact $2^a$ of the other set is one-half the pitch or distance between the two contacts of one set. All the contacts $1^a$ of one set and $2^a$ of the other set are electrically connected, as shown—that is to say, alternate contact-buttons are joined together. As shown, the series of contacts $2^a$ is connected by wire p to the insulated end o of the needle W, while the series of contacts $1^a$ is connected by wire q to the auxiliary contacts X′ and Y′ on the voltmeter, whereby movement of the needle W to the right or left serves to connect wire p to wire q, thereby connecting the sets of contacts $1^a$ and $2^a$ with each other. The main brush D is provided with a shoe or contact D′, insulated from the main portion of the brush and of slightly less width than the distance between two contact-buttons of one series of contacts—that is to say, the width of the shoe D' is less than the distance between two contacts 2ª or two contacts 1ª. One of the series of contact-buttons is connected to one side of the system, as the negative side, and the other is not connected to any source of supply except when the voltmeter-hand makes contact at X' or Y'. In this instance let it be assumed that the cells at the left-hand side of the series at A² are negative, while the cells at the other side or at the end cells are positive or at the positive side of the storage battery. A positive wire 70 connects the bus-bar G with the contacts 13 and 15 of the reversing-switch L. A negative wire 71 connects the negative side A² of the storage battery to the central contact 14 of the reversing-switch. Another wire 72 connects the series of contacts 2ª with the negative wire 71, said wire 72 being connected between the point 73 and the contact 14 and including in its circuit the solenoid L², provided with the retracting-spring 74. Solenoid L² controls a core 75, adapted to coöperate with the cross-bar of the reversing-switch and lock said switch in a given position as long as the magnet L² is energized. The wires 19, 20, and 21 connect the reversing-switch with the voltmeter as before and connect the voltmeter-needle W with the main line. Motor connections are also arranged as before.

The operation of the apparatus in Fig. 2 is as follows: If the potential across the cells A, which are included between the brushes D and E, increases to such a point that full charge of those cells to the right of the duplex brush is indicated, the voltmeter-needle W will move, let us assume, to the right, in which case contact will be made between the needle and contacts X and X'. The motor I will be rotated to move the duplex brush C in the proper direction. The insulated contact o of the needle W connects the series of contacts 1ª to the wire p and thence by wire 72 and magnet L² to the negative wire 71. Current may therefore flow from the end cells A through contact-arm D, magnet 65, to the shoe D'. Thence if said shoe is in the proper position current will flow through the wire connecting the series of contacts 1ª and out to the negative wire 71 by means of wire 72 and the magnet L². The detent of the magnet 65 is moved into position to prevent the rotation of the sleeve 50, and the core 75 of magnet L² locks the reversing-switch in the desired position. As soon as the traveling sleeve 50 has moved a short distance from the position shown in Fig. 2 to a point in which a portion of the shoe D' touches one of the contacts 2ª a condition of the circuits is established such that two paths are provided for the current passing through the magnets 65 and L². One path is from the positive side of the circuit through magnet 65 and shoe D' to the contact 2ª, thence to the point 73, and out by wire 72 and magnet L² to the negative side of the circuit. The other path is from the shoe D' through the wire-connecting contacts 1ª, thence through wires q and p to the point 73, and out through magnet L². The movement of the sleeve 50 will therefore continue as long as the shoe D' touches any one of the contacts 2ª or as long as the voltmeter hand or needle W holds the insulated end o against the auxiliary contact X'. If after the beginning of the movement of the sleeve 50 and duplex brush the voltmeter-needle W should move away from the contacts against which it is bearing, the motion of the sleeve 50 will not be stopped, because the shoe D', bearing upon one of the contacts 2ª, enables a circuit to be completed directly to the point 73 and out through magnet L², although the circuit through the voltmeter hand or needle W is broken. When the shoe D' of the switch arm D finally moves to a position in which contact is not made with any of the contacts 2ª, the circuit through the magnet L² will be broken and the reversing-switch released unless the voltmeter-needle W still completes the circuit. As soon as magnet L² is deenergized, as well as the reversing-switch magnet, the reversing-switch arms resume normal position, the current is switched off of the motor, and the sleeve 50 immediately stops moving, although the momentum of the motor-armature may cause the screw to make several turns after the current has been switched off. The immediate stopping of the sleeve 50 is due to the releasing of the sleeve-detent by the magnet 65. If, on the other hand, the voltmeter needle or hand W bears against the contacts X X' Y Y' when the shoe D' reaches the position as indicated in Fig. 2, movement of the sleeve 50 will continue.

Obviously any other suitable form of apparatus may be substituted for the magnet L² to control the reversing-switch L, and instead of a voltmeter V, as indicated, any suitable form of electroresponsive switching device may be used which is responsive to the electrical condition of the end cells A.

One of the sets of contacts 1ª or 2ª may be eliminated by the use of a spring-contact like that shown in Fig. 3. This figure is a vertical sectional view of the spring-contact referred to, in which D', as before, is the shoe of the arm D and, as shown, is provided with a depressed portion D³. The shoe D' is adapted to be moved to the right or left over the spring-pressed button or contact P', which moves in the socket Q'. The wires of the circuits are led to the binding-screws 80 and 81. The binding-screw 80 is in electrical connection with the socket Q³, and hence with contact P'. The binding-screw 81, as shown, is insulated from the support of the socket Q³ and is provided with a spring-contact 82, with which the plunger 83, connected to contact P', is adapted to coöperate. As the shoe D' is moved in one direction or the other it will be seen that the contact P' is depressed, thereby moving the plunger 83 into contact with the spring 82 and completing the circuit between the shoe D' and the binding-screw 81. In the construction of contacts shown in Fig. 3 it is to be understood that the contacts P' represent one series of contacts, as 1ª, while the springs 82 represent the other series of contacts, as 2ª.

The end-cell switch may of course be used in any connection in which it is found applicable, either for charging or discharging end cells, and appropriate changes may be made in the circuits and apparatus to adapt the switch to different uses.

Obviously some features of this invention may be used without others, and the invention may be embodied in widely-varying forms.

Therefore, without limiting myself to the constructions shown and described nor enumerating equivalents, I claim, and desire to obtain by Letters Patent, the following:

1. The combination with the end cells of a storage battery, of reversible charging means having a switch-brush, circuits and connections for automatically controlling the charging means in accordance with the electric condition of the end cells, whereby the brush is moved in either direction, and means for automatically determining the position of the brush in accordance with the electric condition of the end cells.

2. The combination with the end cells of a storage battery, of reversible charging means having a switch-brush, circuits and connections for automatically controlling the charging means in accordance with the potential due to the electric condition of the end cells, whereby the brush is moved in either direction, and means for automatically determining the position of the brush in accordance with the electric condition of the end cells.

3. The combination with the end cells of a storage battery, of reversible charging means having a switch-brush, circuits and connections for automatically controlling the charging means solely in accordance with the electric condition of the end cells, whereby the brush is moved in either direction, and means for automatically determining the position of the brush in accordance with the electric condition of the end cells.

4. The combination with the end cells of a storage battery, and contacts connected thereto, of reversible charging means having a switch-brush, circuits and connections for automatically controlling the charging means in accordance with the potential existing between two of said contacts, whereby the brush is moved in either direction, and means for automatically determining the position of the brush in accordance with the electric condition of the end cells.

5. The combination with the end cells of a storage battery, of a reversibly-movable charging-switch having a switch-brush, means automatically controlled in accordance with the electric condition of the end cells for actuating said brush, and means for automatically determining the position of the brush in accordance with the electric condition of the end cells.

6. The combination with the end cells of a storage battery, of reversible automatic charging means having a switch-brush, circuits and connections whereby the position of the charging means is automatically changed to charge different cells as required, and means for automatically determining the position of the brush in accordance with variations in the electric condition of the end cells.

7. The combination with the end cells of a storage battery, of reversible automatic charging means having a switch-brush, circuits and connections so constructed and arranged that the charging means is moved to automatically recharge any or all of the cells as they become discharged beyond a predetermined amount, and means for automatically determining the position of the brush in accordance with the electric condition of the end cells.

8. The combination with the end cells of a storage battery, of a source of supply for charging the same, a reversible switch having a switch-brush controlling the charging of said end cells, means for actuating said switch, means controlled by the voltage of one or more of the end cells for automatically controlling the switch-actuating means, and means for automatically determining the position of the switch-brush in accordance with the electric condition of the end cells.

9. The combination of the end cells of a storage battery continuously connected to the work-circuit, charging means, and circuits and connections for automatically controlling the charging means in accordance with the electric condition of the end cells.

10. The combination with the end cells of a storage battery, of automatic charging means, controlling-circuits and connections so arranged and constructed that said automatic charging means is shifted from any set of end cells to any other set and back again as required, whereby any or all of the end cells are automatically recharged as they become discharged beyond a predetermined amount.

11. The combination with the end cells of a storage battery, of a source of supply for charging the same, a switch controlling the charging of said end cells, means for actuating said switch, and means controlled by the voltage of particular individual end cells undergoing charging for automatically controlling the switch-actuating means.

12. The combination with the end cells of a storage battery, of a source of charging-current, cell-contacts and bus-bars, a duplex brush having contact-arms insulated from each other and adapted to connect different cell-contacts to the bus-bars respectively, means for actuating the duplex brush along the contacts in either direction, and an electrical device controlled by the voltage between the bars due to the cells for controlling the operation of the brush-actuating means.

13. The combination with the end cells of a storage battery, of a series of contacts between which the end cells are connected, a main and auxiliary bus-bars, a main contact-arm adapted to connect successive contacts to a main bus-bar, an auxiliary brush connected to move with the main brush at a definite distance therefrom and arranged to connect successive contacts with an auxiliary bus-bar, an electrical device connected between the main and auxiliary bus-bars, and means for actuating the main and auxiliary brushes in either direction, said means being controlled by the electrical device connected between the bus-bars, said device operating in accordance with variations in voltage between said bars.

14. The combination with the end cells of a storage battery, of automatic charging means, controlling-circuits and connections therefor so constructed and arranged that the position of the said charging means is automatically changed to charge different cells as required, and means for preventing the short-circuiting of the cells as the automatic charging means is moved.

15. The combination with the end cells of a storage battery, of a source of charging-current, cell-contacts and bus-bars, a duplex brush having contact-arms insulated from each other and adapted to connect different cell-contacts to the bus-bars respectively, means for actuating the duplex brush along the contacts in either direction, an electrical device controlled by the voltage between the bars due to the cells for controlling the operation of the brush-actuating means, and electrical means connected to the arms of said duplex brush for preventing short-circuiting of the end cells as the brush moves.

16. The combination with the end cells of a storage battery, of an automatic charging-switch, controlling-circuits and connections therefor so constructed and arranged that the switch is moved to automatically charge the cells as required by the system, and means for preventing the stoppage of said switch in its movement before it reaches the proper position for charging.

17. The combination with the end cells of a storage battery, of a charging-switch, means automatically controlled by the electric condition of the cells for actuating said switch, and means for preventing the stoppage of the movement of the switch before the desired position is reached.

18. In an end-cell switch, the combination of at least two sets of auxiliary contacts, a switch-arm, means for actuating said arm, and circuits and connections so arranged that the switch-arm is actuated as long as said sets of auxiliary contacts are electrically connected, and continues to move to the desired position after said sets of contacts are disconnected.

19. The combination of the end cells of a storage battery permanently connected in series, automatic charging means, circuits and connections therefor so arranged and constructed that a variable number of said cells are inserted in the charging-circuit, and automatic means for controlling the position of said charging means in accordance with the electric condition of the end cells.

20. The combination with the end cells of a storage battery permanently connected in series, of automatic charging means, circuits and connections therefor so arranged that the charging means is moved to recharge the cells, and automatic means for determining the position of said charging means in accordance with the degree of charge in the individual cell which is last placed in circuit.

21. The combination with the end cells of a storage battery, of a charging-switch having a brush, automatic means for actuating said charging means, and circuits and connections so arranged and constructed that the movement of the brush is proportional to the change in the state of charge of the cells and in a direction to include all cells falling below a predetermined charge.

In testimony whereof I have signed this specification in the presence of two subscribing witnesses.

LAMAR LYNDON.

Witnesses:
E. N. ROBINSON,
HERBERT G. OGDEN, Jr.